United States Patent Office

2,988,560
Patented June 13, 1961

2,988,560
PREPARATION OF CARBOXYLIC ACIDS AND SALTS THEREOF
Louis Schmerling, Riverside, and Walter G. Toekelt, Downers Grove, Ill., assignors, by mesne assignments, to Universal Oil Products Company, Des Plaines, Ill., a corporation of Delaware
No Drawing. Filed June 2, 1958, Ser. No. 739,001
20 Claims. (Cl. 260—413)

This invention relates to a method for preparing organic compounds of relatively high molecular weight, and particularly to a method of preparing relatively high molecular weight organic salts and acids.

More particularly yet, the invention is concerned with the preparation of alkali metal salts and alkaline earth metal salts of relatively high molecular weight organic compounds and also the preparation of their corresponding acids.

Relatively high molecular weight organic acids or the alkali metal salts and alkaline earth metal salts thereof find many uses as intermediates in the chemical field. For example, the higher molecular weight organic acids are used as intermediates in the preparation of esters which are used in preparing artificial perfumes and flavors. Furthermore, certain esters may also be used as solvents, especially in the manufacture of quick drying paints and lacquers. In addition, the alkali metal salts of the higher molecular weight polycarboxylic acids may be used in the preparation of soaps or cleansing agents.

It is therefore an object of this invention to provide a method for the preparation of alkali metal and alkaline earth metal salts of higher molecular weight organic acids.

A further object of this invention is to provide a method for the preparation of alkali metal and alkaline earth metal salts of both higher molecular weight mono- and polycarboxylic acids and also a method of preparing the acids themselves.

One embodiment of this invention is found in a process for the preparation of a salt of a higher molecular weight organic acid which comprises reacting an olefin with a compound selected from the group consisting of α-substituted alkali metal organometallic derivatives of alkali metal salts of saturated carboxylic acids and α-substituted alkaline earth metal organometallic derivatives of alkaline earth metal salts of saturated carboxylic acids, hydrolyzing the resultant product and recovering the desired salt of a higher molecular weight organic acid.

A further embodiment of the invention is found in a process for the preparation of a salt of a higher melocular weight organic acid which comprises reacting an olefin with an α-substituted sodium derivative of a sodium salt of a saturated carboxylic acid at a temperature in the range of from about 50° to about 300° C., in the presence of an inert organic diluent, hydrolyzing the resultant product, and recovering the desired sodium salt of a higher molecular weight organic acid.

A specific embodiment of the invention is found in a process for the preparation of a sodium salt of a higher molecular weight organic acid which comprises reacting ethylene with sodium α-sodioacetate at a temperature in the range of from about 50° to about 300° C. in the presence of n-heptane, hydrolyzing the resultant product, and recovering the desired sodium 2,2-diethylbutyrate.

Yet another embodiment of the invention is found in a process for the preparation of a higher molecular weight organic acid which comprises reacting an olefin with a compound selected from the group consisting of α-substituted alkali metal organometallic derivatives of alkali metal salts of saturated carboxylic acids and α-substituted alkaline earth metal organometallic derivatives of alkaline earth metal salts of saturated carboxylic acids, hydrolyzing the resultant product to form a salt of a higher molecular weight organic acid, thereafter acidifying the last-named product and recovering the desired higher molecular weight organic acid.

Another specific embodiment of the invention resides in a process for the preparation of a higher molecular weight organic acid which comprises reacting ethylene with potassium α-potassioacetate at a temperature in the range of from about 50° to about 300° C. in the presence of an inert organic diluent, hydrolyzing the resultant product to form potassium 2,2-diethylbutyrate, thereafter acidifying the last-named compound, and recovering the desired 2,2-diethylbutyric acid.

Other objects and embodiments referring to alternative α-substituted alkali metal organometallic derivatives of alkali metal salts of saturated carboxylic acids, α-substituted alkaline earth metal organometallic derivatives of alkaline earth metal salts of saturated carboxylic acids, olefins and alternative diluents will be found in the following further detailed description of the invention.

As hereinbefore set forth this invention is concerned with the preparation of alkali metal salts and alkaline earth metal salts of higher molecular weight organic acids and also to the preparation of these acids themselves. These compounds are prepared by reacting an unsaturated organic compound containing an ethylenic double bond with either an α-substituted alkali metal organometallic derivative of an alkali metal salt of a saturated carboxylic acid or an α-substituted alkaline earth metal organometallic derivative of an alkaline earth metal salt of a saturated carboxylic acid.

The olefins which may be used in the process of this invention include alkenes, cycloalkenes, alkadienes, cycloalkadienes, and polyenes. The alkenes include straight and branched chain olefins such as ethylene, propene, 1-butene, 2-methyl-1-propene, 1-pentene, 2-pentene, 2-methyl-1-butene, 3-methyl-1-butene, 1-hexene, 2-hexene, 3-hexene, 2-methyl-1-pentene, 3-methyl-1-pentene, 2,3-dimethyl-1-butene, the straight and branched chain heptenes, octenes, nonenes, decenes, etc. In general, the preferred olefins are the straight chain 1-alkenes, of which ethylene is the preferred species. It is also contemplated within the scope of this invention that cyclic olefins such as cyclopentene, cyclohexene, cycloheptene, etc., and diolefins such as butadiene, isoprene, etc., may also be used although not necessarily with equivalent results.

The α-substituted alkali metal or alkaline earth metal compounds of the type hereinbefore set forth which may be used include the derivatives of the salts of fatty acids in which hydrogen attached to an α-carbon atom is replaced by an alkali metal or alkaline earth metal atom, such compounds including sodium α-sodioacetate, potassium α-potassioacetate, lithium α-lithioacetate, rubidium α-rubidioacetate, cesium α-cesioacetate, calcium α-calcioacetate, magnesium α-magnesioacetate, barium α-barioacetate, strontium α-strontioacetate, sodium α-sodiopropionate, potassium α-potassiopropionate, lithium α-lithiopropionate, rubidium α-rubidiopropionate, cesium α-cesiopropionate, calcium α-calciopropionate, magnesium α-magnesiopropionate, barium α-bariopropionate, strontium α-strontiopropionate, sodium α-sodiobutyrate, potassium α-potassiobutyrate, lithium α-lithiobutyrate, rubidium α-rubidiobutyrate, cesium α-cesiobutyrate, calcium α-calciobutyrate, magnesium α-magnesiobutyrate, barium α-bariobutyrate, strontium α-strontiobutyrate, sodium α-sodiosobutyrate, potassium α-potassiosobutyrate, etc., the aformentioned alkali metal and alkaline earth metal organometallic derivatives of the alkali metal and alkaline earth metal salts of the valerates, hexanoates, heptanoates, octanoates, etc.; sodium α-sodiocyclohexanecarboxylate, potassium α-potassiocyclohexanecarboxylate, lithium α-lithiocyclohexanecarboxylate, cesium α-cesiocyclohexanecarboxylate, magnesium α-magnesiocyclohexanecarboxylate, calcium α-calciocyclohexanecarboxylate, sodium α-sodiocyclohexylacetate, potassium α-potassiocyclohexylacetate, lithium α-lithiocyclohexylacetate, cesium α-cesiocyclohexylacetate, magnesium α-magnesiocyclohexylacetate, calcium α-calciocyclohexylacetate, etc.; sodium α-sodiophenylacetate, potassium α-potassiophenylacetate, lithium α-lithophenylacetate, rubidium α-rubidiophenylacetate, cesium α-cesiophenylacetate, calcium α-calciophenylacetate, magnesium α-magnesiophenylacetate, barium α-bariophenylacetate, strontium α-strontiophenylacetate, sodium α-sodio-β-phenylpropionate, potassium α-potassio-β-phenylpropionate, lithium α-lithio-β-phenyl-propionate, rubidium α-rubidio-β-phenylpropionate, cesium α-cesio-β-phenylpropionate, calcium α-calcio-β-phenylpropionate, magnesium α-magnesio-β-phenylpropionate, barium α-bario-β-phenylpropionate, strontium α-strontio-β-phenylpropionate, etc., the aforementioned alkali metal and alkaline earth metal phenylbutyrates, phenylvalerates, phenylhexanoates, etc. In addition it is also contemplated within the scope of this invention that dicarboxylic acids in which one or both α-carbon atoms are attached to an alkali metal or alkaline earth metal including the mono-substituted compounds such as sodium sodiomalonate, potassium potassiomalonate, lithium lithiomalonate, rubidium rubidiomalonate, cesium cesiomalonate, calcium calciomalonate, magnesium magnesiomalonate, barium bariomalonate, strontium strontiomalonate, sodium α-sodiosuccinate, potassium α-potassiosuccinate, lithium α-lithiosuccinate, rubidium α-rubidiosuccinate, cesium α-cesiosuccinate, calcium α-calciosuccinate, magnesium α-magnesiosuccinate, barium α-bariosuccinate, strontium α-strontiosuccinate, etc.; di-α,α'-substituted compounds such as sodium α,α'-disodiosuccinate, potassium α,α'-dipotassiosuccinate, lithium α,α'-dilithiosuccinate, calcium α,α'-dicalciosuccinate, etc.; and the aforementioned alkali metal and alkaline earth metal glutarates, adipates, pimelates, suberates, sebacates, etc., may also be used, although not necessarily with equivalent results. For the purposes of this invention the aryl substituted acids such as phenylacetic acid, α-p-tolylpropionic acid, etc., are considered as falling within the term "saturated carboxylic acids." Due to the relatively greater availability and relatively lower cost, as well as the relatively greater yields which are obtained thereby, the sodium and potassium derivatives of the aforementioned acids are the preferred reactants of the present process. The salts may contain more than one alkali metal, such compounds including potassium α-sodioacetate, sodium α-potassiopropionate, etc.

Diluents which may be employed in the process of this invention comprise inert organic hydrocarbons and include the saturated aliphatic hydrocarbons such as the pentanes, hexanes, heptanes, octanes, nonanes, etc.; cyclic and alkyl substituted cyclic hydrocarbons such as cyclopentane, cyclohexane, cycloheptane, etc., methylcyclopentane, methylcyclohexane, methylcyclohepatane, etc.; aromatic hydrocarbons such as benzene, toluene, o-, m- and p-xylene, ethylbenzene, etc., may also be used but are usually less preferable, since they may not be completely inert under the reaction conditions. Tertiary alkyl and arylamines such as tributylamines and dimethylaniline may also be employed as may alkyl and polyalkyl ethers such as dibutyl ether and bis-(ethoxyethyl) ether.

Generally speaking the reaction between the α-substituted alkali metal organometallic derivative of an alkali metal salt of a saturated carboxylic acid or an α-substituted alkaline earth metal organometallic derivative of an alkaline earth metal salt of a saturated carboxylic acid and the olefin is effected at a temperature in the range of from about 50° to about 300° C., and preferably at a temperature in the range of from about 150° to about 250° C., the particular temperature being dependent upon the reactants which are being used. In addition the reaction will proceed at an elevated pressure, usually in the range of from about 25 to about 200 atmospheres or more, the pressure being sufficient to maintain a substantial portion of the reactants in liquid form.

The process of this invention may be effected in any suitable manner and may comprise either a batch or a continuous type operation. For example, when a batch type operation is used a quantity of the α-substituted alkali metal organometallic derivative of an alkali metal salt of a saturated carboxylic acid or an alkaline earth metal α-substituted organometallic derivative of an alkaline earth metal salt of a saturated carboxylic acid along with the olefin if in liquid form, and the diluent or solvent, if any is used, is sealed in a suitable apparatus such as a rotating autoclave. If the olefin is in gaseous form, it is pressured in, until the desired pressure has been reached, after sealing the autoclave. The reaction mixture is maintained at the desired temperature for a predetermined period of time after which the autoclave and contents thereof are cooled to room temperature, the excess pressure is vented and the reaction product is recovered by conventional means such as, for example, by dissolving the reaction product in water to hydrolyze said product thereby forming the desired salt of a high molecular weight organic acid. The aqueous solution may then be extracted with ether to separate the diluent and to remove traces of water-insoluble material after which the aqueous solution is concentrated and the desired salt is separated by fractional crystallization. If, as is usually the case, the higher molecular weight organic acid itself is desired, the aqueous solution is acidified by conventional means using acidifying agents such as inorganic acids including hydrochloric acid, sulfuric acid, nitric acid, etc. and recovered by distillation or crystallization, one method consisting of extraction of the acid with a solvent such as ethyl ether followed by fractionation of the extract.

The reaction process of the present invention may also be effected in a continuous type manner. In this type of operation the starting materials comprising the alkali metal or alkaline earth metal organometallic derivatives of the alkali metal or alkaline earth metal salts of the saturated carboxylic acids are continuously charged to a reactor which is maintained at the proper operating conditions of temperature and pressure. The olefin, in either liquid or gaseous form, is also continuously charged thereto through separate lines or, if so desired, may be admixed with the aforementioned salt prior to entry into said reactor and charged thereto in a single stream. In addition, if an organic diluent is used, the diluent may be continuously charged to said reactor through yet another separate line or may be admixed with one of the starting materials prior to entry into said reactor and charged thereto in a single line. The reactor may comprise an unpacked vessel or coil or may be lined with an adsorbent packing material such as alumina, dehydrated bauxite, fire brick and the like. After a predetermined residence time has elapsed the reaction product is continuously withdrawn from the reactor, separated from diluent and unreacted ethylenic compound by convention means, and the reaction product is then continuously charged to a second reaction zone where is undergoes hydrolysis by treatment with water, said water being continuously charged to the second reaction zone. The product is then continuously withdrawn from the second reaction zone, and the desired salt of a higher molecular weight organic acid is then separated by conventional means and recovered. If the higher molecular weight organic acid itself is desired, the salt is then continuously charged to yet a third reaction zone where it is acidified by the addition of an acid of the type hereinbefore set forth. The product is continuously withdrawn from this third reaction zone and the higher molecular weight organic acid is separated by conventional means such as, for example, fractional distillation, fractional crystallization, etc.

The following examples are given to illustrate the process of the present invention, which, however, are not intended to limit the generally broad scope of the present invention in strict accordance therewith.

*Example I*

Twenty grams of sodium α-sodioacetate and 50 g. of n-heptane were placed in a glass liner of a rotating autoclave having a capacity of 850 cc. The liner was sealed into the autoclave and ethylene pressed in until an initial pressure of 51 atmospheres had been reached. The autoclave and contents thereof were then heated to a temperature of about 250° C. and maintained thereat for a period of about 6 hours. During this time the maximum pressure in the autoclave rose to 182 atmospheres. At the end of the reaction time the autoclave and contents thereof were cooled to room temperature, the final pressure at room temperature being 48 atmospheres. The excess pressure was vented, the autoclave was opened and 68 g. of product inside the liner and 9 g. outside the liner were recovered. Water was added and the product was extracted with ether to separate the n-heptane and remove traces of water-insoluble material. The aqueous solution contained a mixture of salts from which sodium 2,2-diethylbutyrate may be separated by fractional crystallization.

To obtain the corresponding higher molecular weight carboxylic acid, the sodium 2,2-diethylbutyrate was acidified using hydrochloric acid as the acidifying agent. The acidified material was extracted with ether and the extract subjected to fractional distillation, seven grams of product boiling at 84–85° C. at 1.4 mm. pressure (240–242° C. at 760 mm. by group V of the Lippincott nomograph, Ind. Eng. Chem., 38, 320 (1946) being separated. These cuts were crystalline in nature and had a melting point of 36° C. The melting point of 2,2-diethylbutyric acid according to the literature is 35° C. and the boiling point is 104–105° C. at 5 mm. pressure (240–241° C. at 760 mm. by the Lippincott nomograph). In addition, the neutral equivalent of the material was 142.8; the calculated value for an octanoic acid being 144.2.

*Example II*

Twenty grams of sodium α-sodioacetate and 50 g. of cyclohexane were placed in the glass liner of a rotating autoclave having a capacity of 850 cc. The liner was sealed into the autoclave and ethylene pressed in until an initial pressure of 52 atmospheres had been reached. The autoclave was then heated to a temperature of about 250° C. and maintained thereat for a period of about 6 hours. During this time the maximum pressure reached 178 atmospheres. At the end of the aforementioned period of time the autoclave and contents thereof were cooled to room temperature, the final pressure at room temperature being 45 atmospheres. The excess pressure was vented and the reaction product comprising 70 g. inside the liner and 9 g. outside the liner were combined and treated with water. The water solution was extracted with ether to separate cyclohexane and other water-insoluble material. The aqueous solution was acidified with hydrochloric acid, extracted with ether and the ether extract subjected to fractional distillation under reduced pressure. Seven grams of 2,2-diethylbtuyric acid was recovered therefrom.

*Example III*

Twenty grams of lithium α-lithioacetate and 50 g. of benzene are placed in a rotating autoclave. The autoclave is sealed and ethylene pressured in until an initial pressure of approximately 50 atmospheres is reached. The autoclave is then heated to a temperature of about 275° C. and maintained thereat for a period of about 6 hours. At the end of this time the autoclave and contents thereof are cooled to room temperature, the excess pressure is vented and the reaction product is dissolved in water and extracted with ether. The desired product comprising lithium 2,2-diethylbutyrate is separated and recovered from the aqueous solution by fractional crystallization.

Acidification of the aqueous solution with hydrochloric acid followed by ether extraction and distillation of the ether extract yields the desired organic acid, comprising 2,2-diethylbutyric acid.

*Example IV*

A mixture of 20 g. of sodium α-sodiopropionate and 50 g. of n-heptane are placed in an apparatus similar to that hereinbefore described in Examples I and II. The autoclave is sealed and ethylene pressed in until an initial pressure of approximately 50 atmospheres is reached. The autoclave and contents thereof are heated to a temperature of 150–250° C. during a period of about 6 hours. At the end of this 6 hours the autoclave and contents are cooled to room temperature, the excess pressure is vented and the reaction product is treated in a manner analogous to that used with the products of Examples I and II and sodium 2,2-diethylpropionate or 2,2-diethylpropionic acid, boiling at 63–65° C. at 0.9 mm. pressure, is recovered.

*Example V*

A mixture of 20 g. of sodium α-sodioacetate and 50 g. of cyclohexane are placed in the glass liner of a rotating autoclave which is thereafter sealed. Propylene (100 g.) is pressed in, an initial pressure of approximately 12 atmospheres being reached. The autoclave is heated to a temperataure of about 250° C. during about two hours and maintained at that temperature for four hours. At the end of the desired reaction time, the autoclave and contents thereof are cooled to room temperature, the excess pressure is vented and the reaction product is treated as described in the above examples to recover sodium 2,2-dipropylvalerate or 2,2-dipropylvaleric acid. Some less completely propylated product, valeric acid and 2-propylvaleric acid may also be isolated from lower boiling fractions.

*Example VI*

A mixture of 50 g. of sodium α-sodiostearate and 50 g. of tributylamine is placed in the glass liner of a rotating autoclave which is thereafter sealed. Ethylene is pressed in until an initial pressure of approximately 50 atmospheres is reached, after which the autoclave is heated at a temperature of about 150–250° C. for 6 hours. At the end of the desired reaction time, the autoclave and contents thereof are cooled to room temperature, the excess pressure is vented and the reaction product is treated with water, the tributylamine layer is separated, the aqueous layer is extracted with ether, and then the aqueous layer is acidified with dilute sulfuric acid and ether extracted. Distillation of the ether extract yields 2,2-diethylstearate, boiling chiefly at 198–200° C. and melting at 42–44° C.

We claim as our invention:

1. A process for the preparation of a salt of a carboxylic acid which comprises reacting ethylene with a compound selected from the group consisting of α-substituted alkali metal organometallic derivatives of alkali metal salts of alkyl carboxylic acids and α-substituted alkaline earth metal organometallic derivatives of alkaline earth metal salts of alkyl carboxylic acids at a temperature of from about 50° to about 300° C., hydrolyzing the resultant product, and recovering the desired salt of a carboxylic acid.

2. A process for the preparation of a salt of a carboxylic acid which comprises reacting a mono-olefinic alkene with a compound selected from the group consisting of α-substituted alkali metal organometallic derivatives of alkali metal salts of alkyl carboxylic acids and α-substituted alkaline earth metal organometallic derivatives of alkaline earth metal salts of alkyl carboxylic acids at a temperature in the range of from about 50° to about 300° C., hydrolyzing the resultant product, and recovering the desired salt of a carboxylic acid.

3. A process for the preparation of a salt of a carboxylic acid which comprises reacting a mono-olefinic alkene with the α-substituted sodium derivative of a sodium salt of an alkyl carboxylic acid at a temperature in the range of from about 50° to about 300° C. in the presence of an inert organic diluent, hydrolyzing the resultant product, and recovering the desired salt of a carboxylic acid.

4. A process for the preparation of a salt of a carboxylic acid which comprises reacting a mono-olefinic alkene with the α-substituted potassium derivative of a potassium salt of an alkyl carboxylic acid at a temperature in the range of from about 50° to about 300° C. in the presence of an inert organic diluent, hydrolyzing the resultant product, and recovering the desired salt of a carboxylic acid.

5. A process for the preparation of a salt of a carboxylic acid which comprises reacting a mono-olefinic alkene with the α-substituted lithium derivative of a lithium salt of an alkyl carboxylic acid at a temperature in the range of from about 50° to about 300° C. in the presence of an inert organic diluent, hydrolyzing the resultant product, and recovering the desired salt of a carboxylic acid.

6. A process for the preparation of a salt of a carboxylic acid which comprises reacting a mono-olefinic alkene with the α-substituted magnesium derivative of a magnesium salt of an alkyl carboxylic acid at a temperature in the range of from about 50° to about 300° C. in the presence of an inert organic diluent, hydrolyzing the resultant product, and recovering the desired salt of a carboxylic acid.

7. A process for the preparation of a salt of a carboxylic acid which comprises reacting a mono-olefinic alkene with the α-substituted calcium derivative of a calcium salt of an alkyl carboxylic acid at a temperature in the range of from about 50° to about 300° C. in the presence of an inert organic diluent, hydrolyzing the resultant product, and recovering the desired salt of a carboxylic acid.

8. A process for the preparation of a salt of a carboxylic acid which comprises reacting ethylene with a compound selected from the group consisting of α-substituted alkali metal organometallic derivatives of alkali metal salts of acetic acid and α-substituted alkaline earth metal organometallic derivaties of alkaline earth metal salts of acetic acid at a temperature in the range of from about 50° to about 300° C. in the presence of an inert organic diluent, hydrolyzing the resultant product, and recovering the desired salt of a carboxylic acid.

9. A process for the preparation of a salt of a carboxylic acid which comprises reacting propylene with a compound selected from the group consisting of α-substituted alkali metal organometallic derivatives of alkali metal salts of propionic acid and α-substituted alkaline earth metal organometallic derivatives of alkaline earth metal salts of propionic acid at a temperature in the range of from about 50° to about 300° C. in the presence of an inert organic diluent, hydrolyzing the resultant product, and recovering the desired salt of a carboxylic acid.

10. A process for the preparation of a sodium salt of a higher molecular weight organic acid which comprises reacting ethylene with sodium α-sodioacetate at a temperature in the range of from about 50° to about 300° C. in the presence of an inert organic diluent, hydrolyzing the resultant product, and recovering the resultant sodium 2,2-diethylbutyrate.

11. A process for the preparation of a salt of a higher molecular weight organic acid which comprises reacting ethylene with potassium α-potassioacetate at a temperature in the range of from about 50° to about 300° C. in the presence of an inert organic diluent, hydrolyzing the resultant product, and recovering the desired potassium 2,2-diethylbutyrate.

12. A process for the preparation of a salt of a higher molecular weight organic acid which comprises reacting propylene with sodium α-sodioacetate at a temperature in the range of from about 50° to about 300° C. in the presence of an inert organic diluent, hydrolyzing the resultant product, and recovering the desired sodium 2,2-dipropylvalerylate.

13. A process for the preparation of a salt of a higher molecular weight organic acid which comprises reacting ethylene with lithium α-lithioacetate at a temperature in the range of from about 50° to about 250° C. in the presence of an inert organic diluent, hydrolyzing the resultant product, and recovering the desired lithium 2,2-diethylbutyrate.

14. A process for the preparation of a carboxylic acid which comprises reacting ethylene with a compound selected from the group consisting of α-substituted alkali metal organometallic derivatives of alkali metal salts of alkyl carboxylic acids and α-substituted alkaline earth metal organometallic derivatives of alkaline earth metal salts of alkyl carboxylic acids at a temperature of from about 50° to about 300° C., hydrolyzing the resultant product to form a salt of a higher molecular weight organic acid, thereafter acidifying the product, and recovering the desired carboxylic acid.

15. A process for the preparation of a higher molecular weight organic acid which comprises reacting ethylene with sodium α-sodioacetate at a temperature in the range of from about 50° to about 300° C. in the presence of an inert organic diluent, hydrolyzing the resultant product to form sodium 2,2-diethylbutyrate, thereafter acidifying the product, and recovering the desired 2,2-diethylbutyric acid.

16. A process for the preparation of a higher molecular weight organic acid which comprises reacting ethylene with potassium α-potassioacetate at a temperature in the range of from about 50° to about 300° C. in the presence of an inert organic diluent, hydrolyzing the resultant product to form potassium 2,2-diethylbutyrate, thereafter acidifying the product, and recovering the desired 2,2-diethylbutyric acid.

17. A process for the preparation of a higher molecular weight organic acid which comprises reacting propylene with sodium α-sodioacetate at a temperature in the range of from about 50° to about 300° C. in the presence of an inert organic diluent, hydrolyzing the resultant product to form sodium 2,2-dipropylvalerylate, thereafter acidifying the product, and recovering the desired 2,2-dipropylvaleric acid.

18. A process for the preparation of a higher molecular weight organic acid which comprises reacting ethylene with sodium α-sodiopropionate at a temperature in the range of from about 50° to about 300° C. in the presence of an inert organic diluent, hydrolyzing the resultant product to form sodium 2,2-diethylpropionate, thereafter acidifying the product, and recovering the desired 2,2-diethylpropionic acid.

19. A process for the preparation of a higher molecular weight organic acid which comprises reacting ethylene with lithium α-lithioacetate at a temperature in the range of from about 150° to about 250° C. in the presence of an inert organic diluent, hydrolyzing the resultant product to form lithium 2,2-diethylbutyrate, thereafter acidifying the product, and recovering the desired 2,2-diethylbutyric acid.

20. A process for the preparation of a higher molecular weight organic acid which comprises reacting ethylene with sodium α-sodiostearate at a temperature in the range of from about 150° to about 250° C. in the presence of an inert organic diluent, hydrolyzing the resultant product to form sodium 2,2-diethylstearate, thereafter acidifying the product, and recovering the desired 2,2-diethylstearic acid.

No references cited.